United States Patent
Hébert et al.

(10) Patent No.: US 10,167,759 B2
(45) Date of Patent: Jan. 1, 2019

(54) INTEGRATION OF EXHAUST GAS RECIRCULATION (EGR), EXHAUST HEAT RECOVERY (EHRS), OIL THERMAL CONDITIONING AND LATENT HEAT STORAGE IN A COMPLETE EXHAUST THERMAL MANAGEMENT MODULE

(71) Applicant: Hanon Systems, Daejeon (KR)

(72) Inventors: Guillaume Hébert, Staré Město (CZ); L'uboslav Kollár, Poriadie (SK); Jiří Bazala, Korytná (CZ)

(73) Assignee: HANON SYSTEMS, Daejeon (KR)

( * ) Notice: Subject to any disclaimer, the term of this patent is extended or adjusted under 35 U.S.C. 154(b) by 237 days.

(21) Appl. No.: 15/237,651

(22) Filed: Aug. 16, 2016

(65) Prior Publication Data

US 2017/0058754 A1 Mar. 2, 2017

(30) Foreign Application Priority Data

Aug. 25, 2015 (CZ) .................................. 2015-573

(51) Int. Cl.
*F02B 33/44* (2006.01)
*F02B 29/04* (2006.01)
(Continued)

(52) U.S. Cl.
CPC ............... *F01N 3/10* (2013.01); *F01N 3/021* (2013.01); *F01N 5/02* (2013.01); *F01P 3/20* (2013.01);
(Continued)

(58) Field of Classification Search
CPC ........ F01N 3/021; F01N 5/02; F01N 2240/02; F02M 26/25; F02M 26/28; F01P 3/20;
(Continued)

(56) References Cited

U.S. PATENT DOCUMENTS

| 5,076,248 A | * | 12/1991 | Schatz | ....................... F01P 3/20 60/599 |
| 5,211,334 A | * | 5/1993 | Schatz | ............... B60H 1/00492 237/12.3 B |

(Continued)

FOREIGN PATENT DOCUMENTS

| CZ | 20130278 A3 | 10/2014 |
| DE | 102008001659 A1 | 1/2009 |

(Continued)

OTHER PUBLICATIONS

A machine translation of Iwanaga (Pub. No. JP 2009-241780 A), published on Oct. 22, 2009.*

(Continued)

*Primary Examiner* — Thai Ba Trieu
(74) *Attorney, Agent, or Firm* — Shumaker, Loop & Kendrick, LLP; James D. Miller

(57) ABSTRACT

A thermoregulation system including an exhaust-gas outlet for discharging exhaust gas from the engine, an engine gas inlet, an exhaust-gas recirculation circuit between the exhaust-gas outlet and the engine gas inlet for recirculating at least part of the exhaust gases, a circuit for conducting and/or circulating the coolant in order to cool the engine, whereby the coolant-conducting circuit includes a latent-heat storage unit which receives heat from or transfers heat to the coolant. A first heat exchanger is arranged in the exhaust-gas recycling circuit to exchange heat between the exhaust gas and the coolant. At least one valve and at least one branch control the flow for controlling the heat exchange in the first heat exchanger. An oil-feed circuit is provided for heating or cooling the oil and includes a second heat exchanger exchanging heat between the oil and the coolant flowing from the first heat exchanger.

9 Claims, 1 Drawing Sheet

(51) Int. Cl.
*F02M 25/07* (2006.01)
*F01N 3/10* (2006.01)
*F02B 37/22* (2006.01)
*F01P 3/20* (2006.01)
*F01N 5/02* (2006.01)
*F01N 3/021* (2006.01)
*F01P 11/20* (2006.01)
*F02M 26/25* (2016.01)
*F02M 26/28* (2016.01)

(52) U.S. Cl.
CPC .............. *F01P 11/20* (2013.01); *F02B 37/22* (2013.01); *F02M 26/25* (2016.02); *F02M 26/28* (2016.02); *F01N 2240/02* (2013.01); *F01P 2011/205* (2013.01); *F01P 2060/16* (2013.01); *Y02A 50/2322* (2018.01); *Y02T 10/16* (2013.01); *Y02T 10/20* (2013.01)

(58) Field of Classification Search
CPC .... F01P 11/20; F01P 2240/02; F01P 2060/16; F02B 37/22; Y02A 50/2322; Y01T 10/16; Y02T 10/20
USPC ....... 60/599, 608.2; 123/41.01, 41.05, 41.08, 123/41.29, 41.33
See application file for complete search history.

(56) References Cited

U.S. PATENT DOCUMENTS

| | | | | |
|---|---|---|---|---|
| 5,339,632 | A * | 8/1994 | McCrabb | F01K 23/065 60/618 |
| 7,721,543 | B2 * | 5/2010 | Massey | F02M 26/28 60/605.2 |
| 7,921,829 | B2 * | 4/2011 | Hayashi | F02M 26/28 123/568.12 |
| 8,151,553 | B1 * | 4/2012 | Schechter | F02M 26/28 123/568.11 |
| 8,365,527 | B2 * | 2/2013 | Raab | F02B 29/0443 60/599 |
| 8,413,434 | B2 * | 4/2013 | Prior | F01N 5/02 60/320 |
| 8,463,495 | B2 | 6/2013 | Spohn et al. | |
| 8,776,872 | B2 * | 7/2014 | Capelle | F02M 26/32 165/158 |
| 8,938,964 | B2 * | 1/2015 | Kanou | F02G 5/02 60/618 |
| 9,617,897 | B2 * | 4/2017 | Hebert | F01N 5/02 |
| 2006/0185364 | A1 * | 8/2006 | Chalgren | F02B 29/0493 60/599 |
| 2009/0020263 | A1 * | 1/2009 | Ohsawa | F02M 26/28 165/104.11 |
| 2014/0305609 | A1 * | 10/2014 | Guillaume | F28D 20/02 165/10 |
| 2015/0013335 | A1 * | 1/2015 | Carstensen | F02G 5/02 60/618 |
| 2015/0121847 | A1 * | 5/2015 | Pursifull | F01N 5/02 60/274 |
| 2015/0136048 | A1 * | 5/2015 | Sundemo | F01P 7/16 123/41.1 |
| 2016/0237960 | A1 * | 8/2016 | Foege | F02M 26/00 |
| 2016/0363038 | A1 * | 12/2016 | Kawamoto | F02M 26/28 |
| 2017/0342949 | A1 * | 11/2017 | Kikuchi | F02M 26/22 |
| 2018/0087430 | A1 * | 3/2018 | Hebert | F01N 5/02 |

FOREIGN PATENT DOCUMENTS

| | | | | |
|---|---|---|---|---|
| DE | 102010003688 A1 | * | 10/2011 | ......... B60H 1/00314 |
| EP | 2623761 A1 | | 8/2013 | |
| EP | 2881690 A1 | * | 6/2015 | ......... F28D 15/0233 |
| JP | 2009241780 A | | 10/2009 | |
| JP | 2011047305 A | | 3/2011 | |
| KR | 20130012998 A | | 2/2013 | |
| WO | 2015088224 A1 | | 6/2015 | |

OTHER PUBLICATIONS

An English Machine Translation reference to Harada Kenichi (Pub. No. JP 2011-047305 A), published on Mar. 10, 2011.*

* cited by examiner

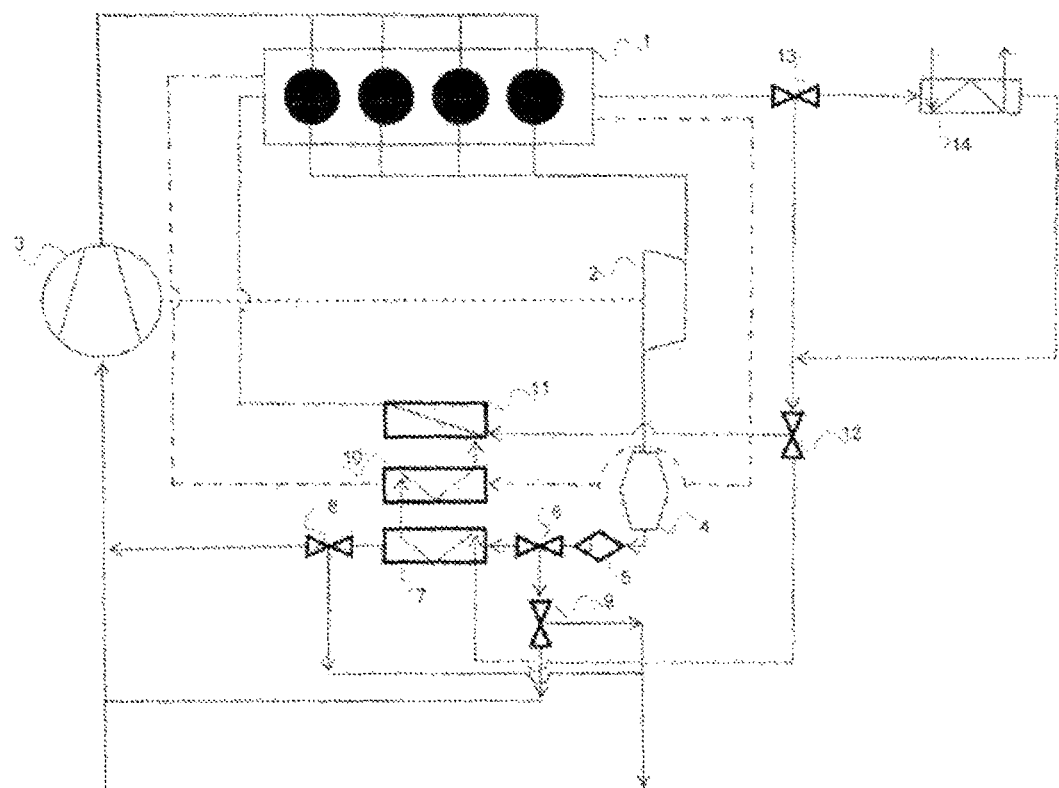

INTEGRATION OF EXHAUST GAS RECIRCULATION (EGR), EXHAUST HEAT RECOVERY (EHRS), OIL THERMAL CONDITIONING AND LATENT HEAT STORAGE IN A COMPLETE EXHAUST THERMAL MANAGEMENT MODULE

CROSS-REFERENCE TO RELATED PATENT APPLICATION

This patent application claims priority to Czech Patent Application No. PV 2015-573 filed on Aug. 25, 2015, the disclosure of which is incorporated herein by reference in its entirety.

FIELD OF TECHNOLOGY

The present invention relates to a thermoregulation system, especially for automobiles.

PRIOR ART

Today's automobiles, especially those with a hybrid drive system, use an exhaust gas recirculation system, in which the heat is dissipated, when driving. However, existing systems fail to provide solutions for certain problems, e.g., the temperature of the coolant in the heat utilization system being lower at the outlet than at the inlet, due to thermal inertia of the system during the period immediately after starting the engine (so-called pre-cooling of the coolant). The low temperature of the engine block during startup also leads to greater mechanical wear and tear, which increases fuel consumption and $CO_2$ emission—this problem is particularly pronounced for cars with a hybrid engine and/or start/stop system.

In existing systems, exhaust gas recirculation (EGR) is separate from the system for removing heat from the exhaust gases (EHRS), and here, too, the need emerges for a high-capacity and sizeable liquid-cooling radiator, as all of the heat from the exhaust gases is transferred to the cooling liquid, which then needs to be cooled. This heat from the exhaust gases goes unused. In addition, existing systems include a separate oil radiator or a water-cooled oil radiator.

The present invention solves these problems.

SUBJECT MATTER OF THE INVENTION

The present invention provides a complete thermoregulation system, which is particularly suitable for automobiles, containing:
  An exhaust gas outlet for discharging exhaust gases from the engine;
  An engine gas inlet;
  An exhaust gas recirculation circuit between the exhaust gas outlet and the gas inlet for recirculating at least part of the exhaust gases;
  A circuit for conducting and/or circulating the coolant in order to cool the engine, whereby the coolant-conducting circuit comprises a unit for storing latent heat, which is carried out to receive heat from the coolant or transfer heat to the coolant;
  A first heat exchanger arranged in the exhaust-gas recycling circuit in order to exchange heat between the exhaust gases and the coolant;
  Means for controlling the flow comprising at least one valve and at least one branch for controlling the heat exchange in the first heat exchanger.

In a preferred embodiment of the invention, the means for controlling the flow include
  a first branch for bypassing the first heat exchanger leading from the first branching point arranged between the engine exhaust gas outlet and the first heat exchanger, and
  a first valve situated in the first branching point.
The flow-control means may further include
  a second branch for feeding the exhaust gas to the exhaust leading from the second branching point before the first heat exchanger, and
  a second valve situated in the second branching point.
Furthermore, the thermoregulation system may preferably comprise
  an oil-feed circuit for heating or cooling the oil comprising a second heat exchanger for exchanging heat between the oil and the coolant flowing in from the first heat exchanger.

The present invention further provides a thermoregulation method, using a system according to the invention comprising the steps of
  feeding at least part of the exhaust gases to the inlet for recirculated gasses via the branch, thus bypassing the first heat exchanger, and
  transferring the heat to the coolant via the latent-heat storage unit.

Preferably, the method further comprises the step, in which, upon exceeding a predetermined value for the exhaust gas temperature, the coolant and the exhaust gas are fed to the first heat exchanger, thus triggering the heat exchange between the coolant and the exhaust gas.

Further, the method preferably comprises the step of exchanging heat between the coolant from the first heat exchanger and the oil for lubricating the engine.

Preferably, the method further comprises the step of feeding the coolant after the heat exchange with oil to the latent-heat storage unit.

One embodiment of the thermoregulation system comprises a catalyst included after the turbocharger turbine, after which a solid particle filter is provided and thereafter, an adjustable valve is provided for controlling the flow of exhaust gases for the part going to the gas/coolant heat exchanger and the part going to the exhaust (after this adjustable valve outlet, a switching valve facing this part of the exhaust gases going to the exhaust or in front of the turbocharger compressor may preferably be included), a gas/coolant heat exchanger is further provided after the adjustable valve, and thereafter, an adjustable valve for dividing the exhaust-gas flow into a part going to the exhaust and a part going to the turbocharger compressor is included. The system includes further a circuit for feeding the coolant, which is typically a cooling liquid, comprising a first thermostatic valve, included after the engine coolant outlet, for admitting the coolant, if the threshold temperature is exceeded; the radiator is then arranged after one outlet of the first thermostatic valve, and a second thermostatic valve is arranged after the second outlet of the first thermostatic valve, whereby the output from one outlet is led to a latent-heat storage unit, and output from the second output is led to a gas/coolant heat exchanger, after which a coolant/oil heat exchanger is arranged, and output from the coolant/oil heat exchanger is led to the latent-heat storage unit, whose output is then led to the engine. The system further includes an oil-feed circuit, in which oil exiting from the engine is conducted into a coolant/oil heat exchanger, whose output is conducted back into the engine.

In this embodiment, the system operates such that in the first engine-running phase, when the coolant does not reach the threshold temperature and the exhaust gases have yet to reach their proper temperature for heating the coolant up to the operating temperature, i.e., immediately after starting the engine, an increase in the engine temperature is provided via the coolant, which removes heat from the unit in order to store the latent heat and transferring it to the engine. In this phase, all the coolant is passed to the latent-heat storage unit via the first and second thermostatic valves.

In the second engine-running phase, when the exhaust gases are already sufficiently hot for heating the coolant to the operating temperature, the coolant is passed to a gas/coolant heat exchanger, which absorbs heat from the exhaust gases, whereupon it is passed to the coolant/oil heat exchanger, which transfers the heat to the oil, and then through the latent-heat storage unit to the engine, where the oil and the coolant heat the engine block up to the operating temperature.

In the third phase, the engine is already heated to the operating temperature and needs to be cooled for further operation. In this phase, the coolant is passed from the engine block via the first thermostatic valve to the radiator, and from there via the second thermostatic valve to the gas/coolant heat exchanger, where the exhaust gases are cooled, and subsequently to the coolant/oil heat exchanger, where the oil is cooled, and then to the latent-heat storage unit, where heat is transferred and stored for subsequent use, when restarting the engine in the first phase.

Heat storage units and their design are already known (heat storage unit, latent storage unit, e.g. http://web.en-gr.oregonstate.edu/~aristopo/in rsch/en98.PDF)

The term "coolant" refers to a coolant [cooling agent] used for cooling automobile engines, particularly a cooling liquid, such as water, or a mixture of water and glycol. In the system according to the present invention, the coolant has a thermoregulation function, i.e., in the first and second phases, when the engine heats up and then cools down.

The said system therefore provides rapid heating of the engine upon starting, and thus a reduction in fuel consumption and the wear and tear of parts, while also storing thermal energy, which in the known prior-art systems is released from the radiator into the environment without being used. To quickly heat the engine, when starting, there is therefore no need for an accessory power source or increasing the fuel consumption, instead this thermal energy is being used.

DESCRIPTION OF THE DRAWINGS

FIG. 1 is schematic representation of a thermoregulation system according to the invention.

EXEMPLARY EMBODIMENTS OF THE INVENTION

The invention is explained below in further detail using the schematic representation in FIG. 1.

The thermoregulation system comprises an exhaust gas conducting circuit (denoted by a solid line) comprising the turbine 2 of a turbocharger included after the engine 1 exhaust gas outlet, and after the turbine 2 of the turbocharger includes a three-way catalyst 4, after which, a solid-particle filter 5 is arranged to prevent entry of solid particles into further parts of the circuit and avoid damage to these parts by the solid particles and after filter 5, an adjustable valve 6 is arranged in order to divide the exhaust gas flow into a part going to the gas/coolant heat exchanger 7 and a part going to the exhaust (after this outlet of the adjustable valve 6 may advantageously be included a switching valve 9 facing this part of the exhaust gases going to the exhaust or the turbocharger compressor 3), after the adjustable valve 6, a gas/coolant heat exchanger 7 is further arranged, and thereafter, an adjustable valve 8 is included for dividing the flow of exhaust gases into a part going to the exhaust and a part going to the turbocharger compressor 3.

In addition, the system comprises a circuit conducting a coolant (denoted by a dashed line), which is typically a cooling liquid, e.g., water or a water-glycol mixture, comprising a first thermostatic valve 13, included at the engine 1 coolant outlet, for admitting the coolant to the radiator 14, if the engine exceeds a threshold temperature, after the first thermostatic valve 13 outlet, a radiator 14 is then arranged, and after the second thermostatic valve 13 outlet a second thermostatic valve 12 is arranged, whereby the output from the first outlet is led to the latent-heat storage unit 11, and the output from the second outlet is led to the gas/coolant heat exchanger 7, after which, a coolant/oil heat exchanger 10 is arranged, and the output from the coolant/oil heat exchanger outlet 10 is fed to the latent-storage heat unit 11, whose output is further led to engine 1.

Moreover, the system comprises an oil-conducting circuit (denoted by a dash-dotted line), in which the engine 1 oil output is led into a coolant/oil heat exchanger 10, whose output is led back into the engine 1.

The system operates such that in the first engine-running phase, when the coolant does not reach the threshold temperature and the exhaust gases have yet to reach the proper temperature for heating the coolant to the operating temperature, i.e., immediately after starting the engine, it provides increased engine temperature via the coolant, which removes heat from the unit 11 in order to store the latent heat, transferring it to the engine 1. In this phase, all the coolant is passed to the latent-heat storage unit 11 via the first 13 and second thermostatic valves 12.

In the second engine-running phase, when the exhaust gases are already sufficiently hot in order to heat the coolant to the operating temperature, the coolant is passed via the first 13 and second thermostatic valves 12 to the gas/coolant heat exchanger 7, where the coolant absorbs heat from the exhaust gases, and subsequently to the coolant/oil heat exchanger 10, where heat is transferred to the oil, and then through the latent-heat storage unit 11 to the engine 1, where the oil and the coolant heat the engine block up to the operating temperature.

In the third phase, the engine is already heated to the operating temperature and needs to be cooled for further operation. In this phase, the coolant is led from the engine block 1 via a first thermostatic valve 13 to the cooler 14, and then via a second thermostatic valve 12 to the gas/coolant heat exchanger 7, where the exhaust gases are cooled, and subsequently to the coolant/oil heat exchanger 10, where the oil is cooled, and then to the latent-heat storage unit 11, where the heat is transferred and stored in this unit 11 for subsequent use, when restarting the engine in the first phase.

What is claimed is:

1. A thermoregulation system comprising:
   an exhaust-gas outlet for discharging an exhaust gas from an engine;
   an engine gas inlet;
   a coolant-conducting circuit conducting a coolant to cool the engine, the coolant-conducting circuit further comprising a latent-heat storage unit receiving heat from or transferring heat to the coolant;

a first heat exchanger arranged in an exhaust-gas recycling circuit exchanging heat between the exhaust gas and the coolant;
a second heat exchanger arranged between the latent-heat storage unit and the first heat exchanger;
at least one valve controlling a flow of the coolant;
a first branch bypassing the first heat exchanger leading from a first branching point arranged between the exhaust-gas outlet of the engine and the first heat exchanger;
a first valve disposed at the first branching point;
a second branch conducting the exhaust gas to an exhaust leading from a second branching point after the first heat exchanger; and
a second valve disposed at the second branching point, at least one of the first valve of the first branching point of the first branch and the second valve of the second branching point of the second branch controlling a heat exchange in the first heat exchanger by adjusting the first valve and the second valve to control a flow of the exhaust gas through the first heat exchanger.

2. The thermoregulation system according to claim 1, further comprising:
an oil-conducting circuit for heating or cooling oil;
wherein the second heat exchanger is positioned in the oil-conducting circuit further to exchange heat between the oil and the coolant flowing from the first heat exchanger.

3. The thermoregulation system according to claim 2, wherein the latent-heat storage unit selectively receives heat from the coolant from at least one of the engine and the second heat exchanger.

4. The thermoregulation system according to claim 1, further comprising:
an exhaust gas conducting circuit comprising:
a turbine of a turbocharger after the engine exhaust gas outlet;
a catalyst arranged after the turbine;
a solid-particle filter arranged after the catalyst;
the first valve dividing the exhaust gas into a part going to the first heat exchanger and a part going to the exhaust, the first heat exchanger arranged after the first valve; and
the second valve dividing the exhaust gas into a part going to the exhaust and a part going to a turbocharger compressor;
wherein the at least one valve controlling the flow of the coolant in the coolant-conducting circuit further comprises:
a first thermostatic valve disposed after the engine coolant outlet, the first thermostatic valve admitting a coolant to a radiator if a threshold temperature is exceeded, the radiator disposed after a first outlet of the first thermostatic valve; and
a second thermostatic valve arranged after a second outlet of the first thermostatic valve,
wherein
a discharge from a first outlet of the second thermostatic valve is led to the latent-heat storage unit and a discharge from a second outlet of the second thermostatic valve is led to the first heat exchanger and a coolant/oil heat exchanger, and
a discharge from the coolant/oil heat exchanger is led to the latent-heat storage unit and then led to the engine; and
an oil-conducting circuit, wherein an oil output from the engine is led into the coolant/oil heat exchanger, and an oil output from the coolant/oil heat exchanger is led back into the engine.

5. The thermoregulation system according to claim 1, wherein at least a part of the exhaust gas is conducted to the engine gas inlet via a third branch, thereby bypassing the first heat exchanger, and heat is transferred to the coolant via the latent-heat storage unit.

6. The thermoregulation system according to claim 5, wherein the coolant and the exhaust gas, are led to the first heat exchanger when a predetermined value for a temperature of the exhaust gas is exceeded, thereby causing heat exchange between the coolant and the exhaust gas.

7. The thermoregulation system according to claim 6, wherein heat is exchanged between the coolant from the first heat exchanger and the oil for lubricating the engine.

8. The thermoregulation system according to claim 7, wherein the coolant is conducted after heat exchange along with the oil to the latent-heat storage unit.

9. The thermoregulation system according to claim 5, wherein:
in a first engine-running phase after starting the engine, the coolant is fed to the latent-heat storage unit via a first thermostatic valve and a second thermostatic valve;
in a second engine-running phase when the exhaust gas is hotter than the coolant, the coolant is fed via the first thermostatic valve and the second thermostatic valve into the first heat exchanger where heat is absorbed from the exhaust gas, and the coolant is subsequently fed to a coolant/oil heat exchanger where the heat is transferred to oil, and the coolant is then fed through the latent-heat storage unit to the engine where the oil and the coolant heat an engine block to an operating temperature; and
in a third engine-running phase when the engine has already heated up to the operating temperature, the coolant is led from the engine block via the first thermostatic valve to the radiator, and then via the second thermostatic valve to the first heat exchanger where the exhaust gas is cooled, and the coolant is subsequently fed into the coolant/oil heat exchanger where the oil is cooled, and the coolant is then fed to the latent-heat storage unit where heat is transferred and stored in the latent-heat storage unit.

\* \* \* \* \*